United States Patent [19]

Rueff et al.

[11] 4,059,187

[45] Nov. 22, 1977

[54] APPARATUS FOR TRANSFERRING AT A PREDETERMINED SPACING ON TO A RECEPTION CONVEYOR OBJECTS FED AT AN IRREGULAR SPACING FROM A DELIVERY CONVEYOR

[76] Inventors: Herbert Richard Rueff, Via Anna Frank, 10, Croce di Casalecchio (Bologna); Franco Aiuola, Via Ranzani, 17, Bologna, both of Italy

[21] Appl. No.: 731,487

[22] Filed: Oct. 12, 1976

[30] Foreign Application Priority Data

Dec. 19, 1975 Italy .................................. 3625/75

[51] Int. Cl.² ............................................. B65G 47/04
[52] U.S. Cl. ................................... 198/461; 198/466; 198/470; 198/476; 198/689; 214/1 BS
[58] Field of Search ............... 198/460, 461, 465, 466, 198/469, 470, 476, 480, 572, 576, 575, 689; 214/1 BA, 1 BS

[56] References Cited

U.S. PATENT DOCUMENTS

| | | | |
|---|---|---|---|
| 3,242,342 | 3/1966 | Gabar | 198/466 |
| 3,302,803 | 2/1967 | Mooney | 198/689 |
| 3,335,841 | 8/1967 | Klingel et al. | 198/460 |
| 3,355,592 | 11/1967 | Muir | 198/460 |
| 3,370,693 | 2/1968 | Marsden | 198/460 |
| 3,608,895 | 9/1971 | Kalven | 198/461 |
| 3,637,074 | 1/1972 | Banyas et al. | 209/74 |
| 3,868,009 | 2/1975 | Billi et al. | 198/480 |
| 3,941,233 | 3/1976 | Aiuola et al. | 214/1 BS |
| 3,990,569 | 11/1976 | Aiuola | 198/461 |

Primary Examiner—Evon C. Blunk
Assistant Examiner—Richard K. Thomson
Attorney, Agent, or Firm—Guido Modiano; Albert Josif

[57] ABSTRACT

An apparatus for transferring at a predetermined spacing on to a reception conveyor objects fed at an irregular spacing from a continuously moving delivery conveyor. The apparatus consists of a transfer conveyor which moves continuously and at a speed different from that of the delivery conveyor from the delivery conveyor to the reception conveyor, object take-up suckers for transferring the objects from the delivery conveyor and for depositing them at regular distances on the reception conveyor and at least one sensor sensing the position of the objects on the delivery conveyor. The apparatus comprises, moreover, a valve associated with each sucker, at least two control devices adapted to assume a position of engagement with the sucker valves to move them to an activation position and a further control device able to engage with the sucker valves to move them into a deactivation position.

6 Claims, 3 Drawing Figures

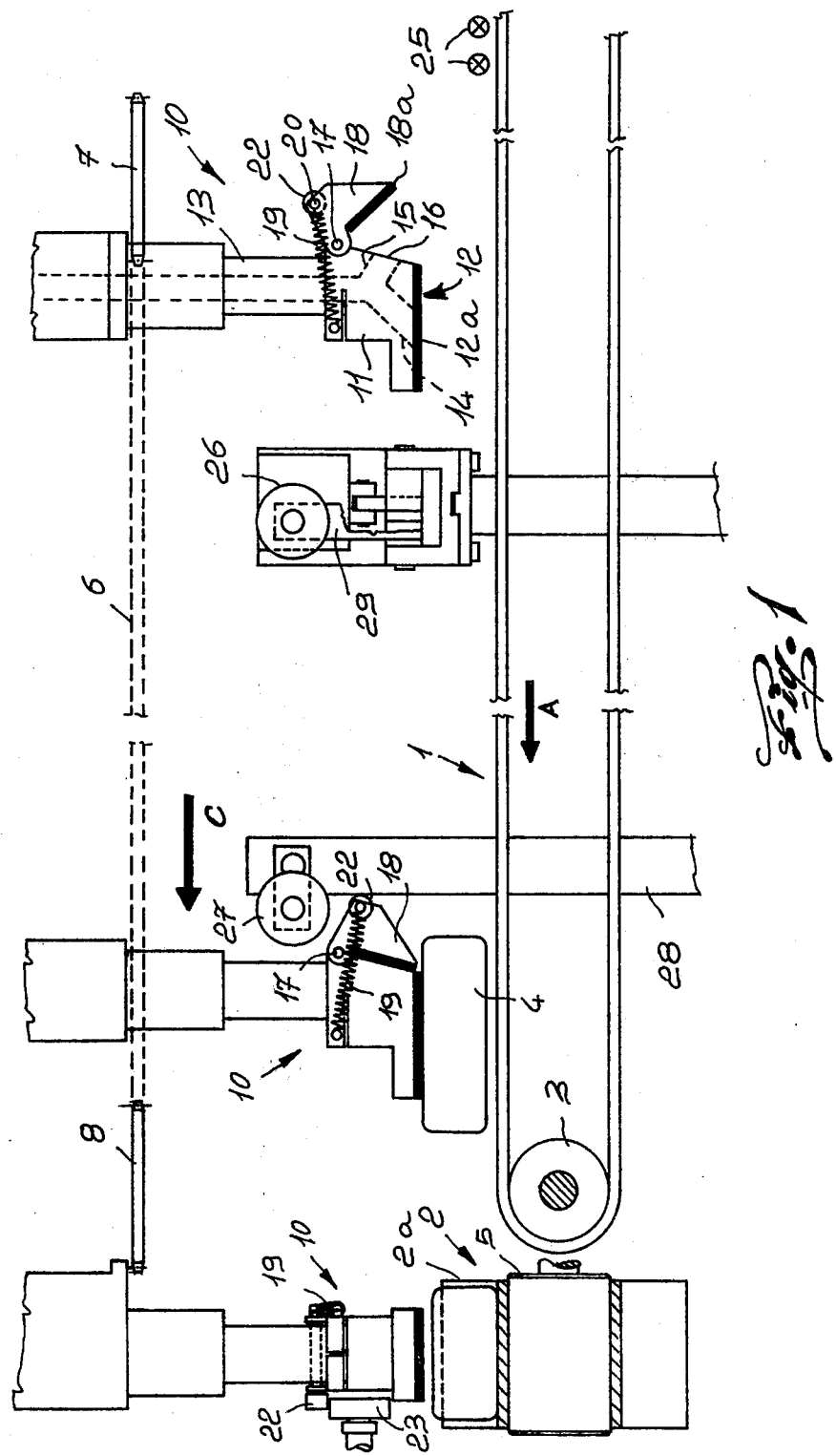

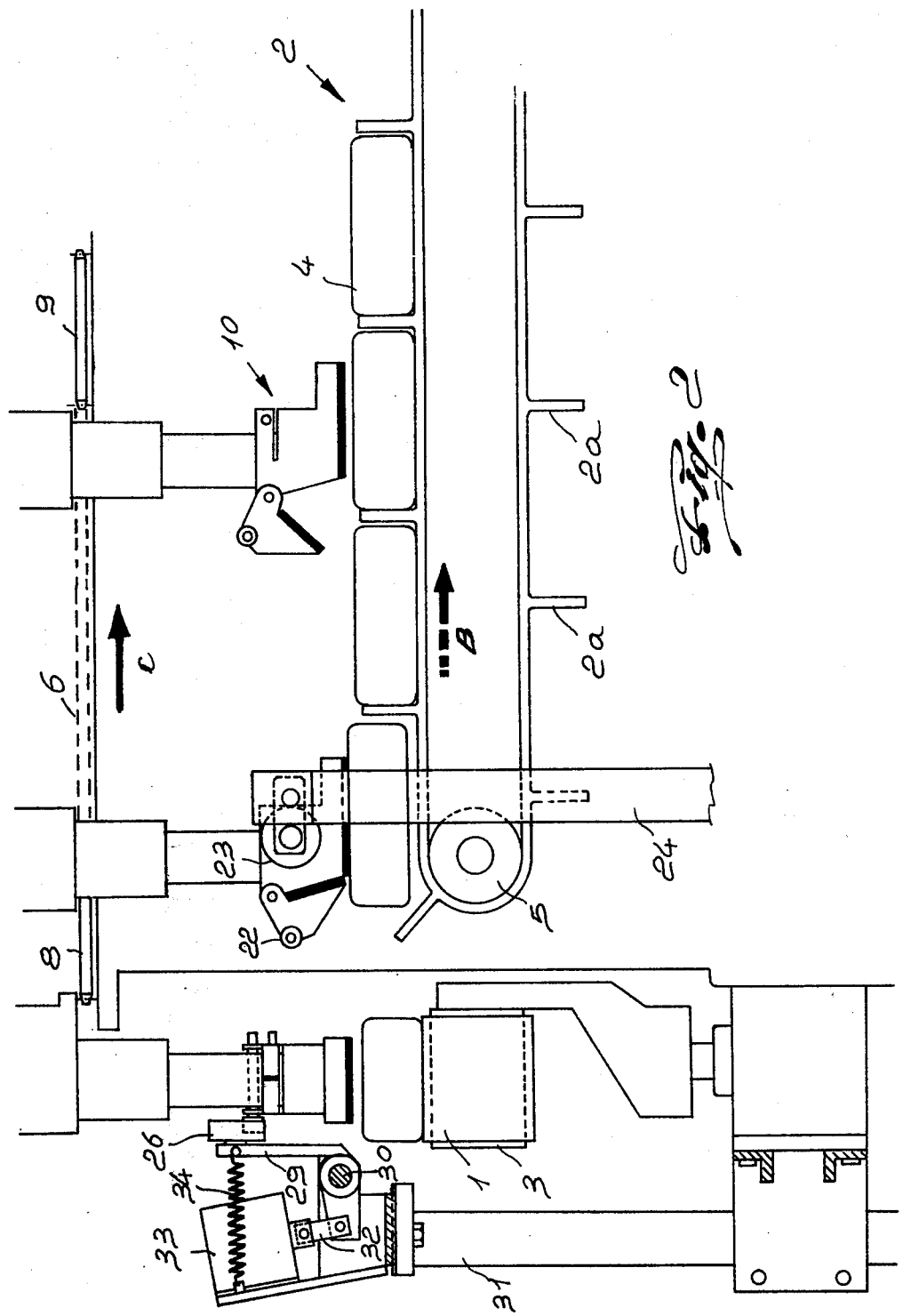

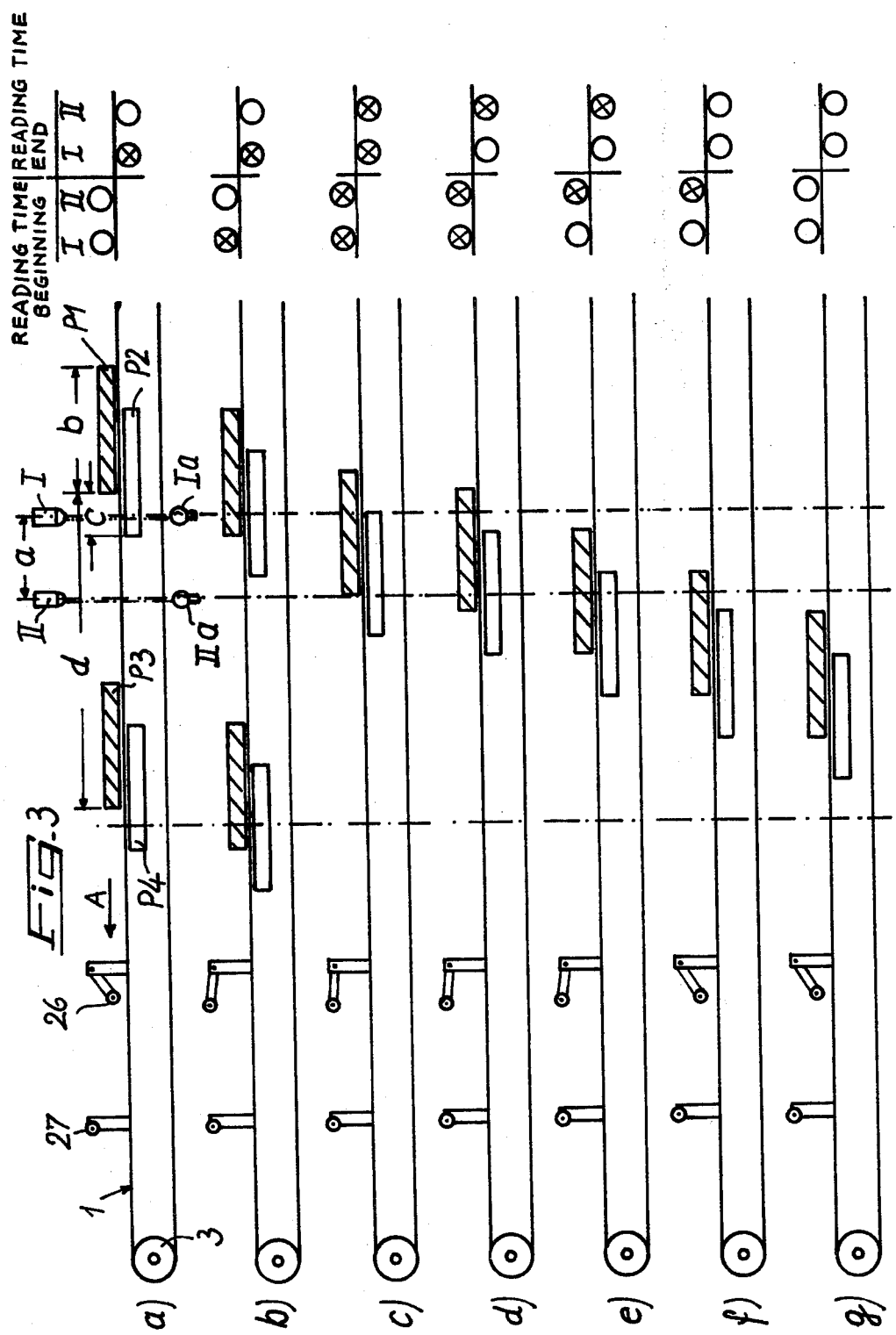

APPARATUS FOR TRANSFERRING AT A PREDETERMINED SPACING ON TO A RECEPTION CONVEYOR OBJECTS FED AT AN IRREGULAR SPACING FROM A DELIVERY CONVEYOR

BACKGROUND OF THE INVENTION

This invention relates to an apparatus for transferring at a predetermined spacing on to a reception conveyor objects fed at an irregular spacing from a delivery conveyor driven with continuous motion.

One of the greatest problems in automatic machines is notably the feeding of objects which arrive at an irregular distance apart.

This problem is even move difficult when dealing with objects such as soaps which are difficult to manipulate without damaging them and when working at high speed.

Apparatus are already known in which the members which regulate the distance and transfer the objects on to the reception conveyor are disposed on a transfer conveyor which moves with a speed different from that of the feed conveyor, and extends partially parallel to the reception conveyor. These regulating and transfer members are able to act on the objects over a prolonged period, and are moved into their working positions by control elements (usually guides and cams) which, in order to be able to act for the necessary time, are of large dimensions and are consequently bulky and costly.

So that they may be disposed between the objects to be regularly spaced apart without damage, these members are activated at predetermined moments, the known control elements thus forming a group and being of different dimensions one to another.

The control elements are chosen by deviators controlled by sensors which determine the position of the objects on the delivery conveyor.

This thus further extends the use of control elements.

SUMMARY OF THE INVENTION

The object of the present invention is consequently to provide an apparatus for regulating the distance between irregularly fed objects, said apparatus satisfying the requirements of simplicity, operational reliablity and economical construction, and being able to operate with precision and care particularly on sensitive objects.

This object is attained by an apparatus consisting of a transfer conveyor which moves with continuous motion and at a speed different from that of the delivery conveyor from the delivery conveyor to the reception conveyor and comprises a first portion parallel to the delivery conveyor and a second portion parallel to the reception conveyor, object take-up suckers disposed at regular distances apart on the transfer conveyor for transferring the objects from the delivery conveyor and for depositing them at regular distances on the reception conveyor, and at least one sensor stationarily disposed in front of the first portion of the transfer conveyor and sensing the position of the objects on the delivery conveyor, characterized in that it comprises a valve associated with each sucker and arranged to assume two stable position relative thereto, namely a position of activation and a position of deactivation of the sucker, at least two control devices disposed in a fixed position along the first portion of the transfer conveyor and which by means of a selective control by the sensor assume a position of engagement with the sucker valves to move them into the activation position, and a further control device disposed in a fixed position on the second portion of the transfer conveyor such as to be able to engage with the sucker valves to move them into the deactivation position.

BRIEF DESCRIPTION OF THE DRAWINGS

Further details of the invention will be more evident from the description given hereinafter of a preferred embodiment illustrated in the accompanying drawings in which:

FIG. 1 is a diagrammatic elevation view of an apparatus for transferring soaps;

FIG. 2 is a view of the apparatus of FIG. 1 taken perpendicular by to the preceding, and FIGS. 3a to 3g show various operating positions of the apparatus.

DESCRIPTION OF THE PREFERRED EMBODIMENTS

In the drawing, the delivery and reception conveyors are indicated by the reference numerals 1 and 2 respectively. The delivery conveyor consists of an endless belt running on rollers, of which that visible in the drawings is indicated by the reference numeral 3.

One of these rollers is driven at constant speed such that the upper portion of the belt 1 moves in the A direction. The reception conveyor 2 also consists, in known manner, of an endless belt comprising projections 2a distributed at equal distances apart. Each pair of projections defines a seat for housing an object 4. The belt 2 also slides on rollers of horizontal axis, of which only the roller 5 is visible in the drawings. The belts 1 and 2 are perpendicular to each other, and the upper portion of the belt 2 lies in the same plane as the upper portion of the belt 1 and moves with intermittent motion in the B direction in steps equal to the distance between two successive projections 2a. The belt 2 is driven in such a manner that the belt 2 reaches, and maintains for a certain period, a constant speed the value and direction of which are equal to the speed and direction of a chain 6 disposed above the belt 1 and 2.

The chain 6 moves with constant speed C about three gear wheels 7,8,9 of vertical axis disposed such that the chain assumes the form of a right angled triangle, the orthogonal sides of which are parallel to the upper portions of the belts 1 and 2. At regular distances, the chain 6 carries suckers 10 for taking up the objects 4. The speed of the chain 6 is different from the speed of the belt 1. It will be assumed hereinafter that the speed of the chain 6 is greater than the speed of the belt 1, and that one seat on the belt 2 is associated with each sucker 10, such that on each step of the apparatus, i.e. on each movement of the belt 2 a sucker 10 overlies a corresponding seat on the belt 2.

Each sucker comprises a lower part 11 provided with a lower flat face 12 on which an annular gasket 12a of elastic material is fitted. A suction tube 13 carried by the chain 6 is sealed on to the upper face of the part 11, and is connected permanently to a known suction pump, not shown. The tube 13 is connected to the pump by a flexible pipe and a rotatable distributor which makes one complete rotation for each revolution of the chain 6. The part 11 (see the right hand side of FIG. 1) comprises a suction duct 14 to which the tube 13 is connected. The part 11 also comprises an auxiliary duct 15 which is connected at one end to the duct 14, and at the other end to an inclined face 16 of the part 11. The face 16 forms an angle with the lower face which is slightly greater than 90°. A cover 18 is hinged by a pin 17 to the rear of the part 11 above the duct 15, and comprises a face provided with a gasket 18a by which it can close the inlet to the auxiliary duct 15. The position of the cover 18 is determined by retention members able to retain the cover in the open or closed position (right hand and left hand position respectively to FIG. 1). The position of the cover 18 is changed by control devices as will be described hereinafter.

The retention members consists of a tension spring 19, the ends of which are fixed to the cover 18 and the part 11. When the line of action passing through the points of engagement 20 and 21 of the spring with the cover 18 and part 11 lies above the pin 17, the cover is kept in the maximum opening position by means of an abutment, so that the induced air passes through the duct 16 and auxiliary ducts 15. The air flow in the tube 13 is thus composed of the sum of the flows in the ducts 14 and 15. However when the line of action of the spring 19 lies below the pin 17, the duct 15 is closed and all air in the tube 13 is sucked through the duct 14, and thus in this case the suction force is greater than when the channel 15 is open. The sucker is therefore able to grip and raise an object situated on the underlying belt 1. Sucker activation, i.e. closure of the auxiliary duct 15, takes place along that portion of the chain 6 parallel to the belt 1 so that the suckers on reaching the respective objects disposed on the belt can grip and raise them. When a sucker has carried the respective object 4 to a position above a seat on the belt 2 at the roller 5, the cover 18 is opened and the object can fall into the underlying seat. The object falls when the relative speed between belt 2 and chain 6 is zero. The cover is opened by a roller 22 mounted to the side of the cover and abutting a roller 23 supported by a column 24 fixed to the apparatus frame. A further stationary control analogous to the roller 23 and disposed along that portion of the belt 1 parallel to the chain 6 is able to close the cover 18 by engaging with the roller 22 thereof.

It has been found in practice however that it is advisable to provide a plurality of successive controls along said portion, and which cause closure of the covers only under determined conditions. It has in fact been found that the suckers correctly deposit the objects picked up from the belt 1 in the seats of the belt 2 only when an object is picked up as the sucker approaches the centre of the object, i.e. when a sucker approaches the object from behind. To achieve this optimum condition, an object sensor is disposed in front of the common portion of the chain 6 and belt 1. The sensor consists for example of two spaced-apart photoelectric cells 25 which become simultaneously active at each forward step of the belt 2 for a predetermined reading time. In this manner, as the suckers 10 are synchronised with the belt 2, the position of a determined object relative to a sucker 10 along the common portion of the belt 1 and chain 6 is detected. This detection establishes whether a sucker is able to reach the relative object or otherwise. If positive, the cover is moved to the closed position. However, if the sucker is in front of the object or is no longer able to reach it, the sucker remains inactive and take-up of the object is left to the next sucker. For this purpose, after the sensor there is provided a first control for closing the sucker cover, consisting of a roller 26 which may be removed from the path of the cover rollers 22. A further roller 27 is provided at a certain distance from the sensor, and is rotatably supported on the fixed column 28 for abutting the rollers 27 of the covers if these latter have not already been lowered by the rollers 26.

If the sensor detects that a sucker should remain inactive because it would otherwise grip the relative object in an unsatisfactory manner, then the roller 26 is moved into a neutral position. The roller 26 is mounted at the end of a swinging lever 29 rotatably supported at 30 on a fixed column 31, its other end being hinged by a link 32 to the armature of an electromagnet 33 mounted on a bracket on the column 31. A spring 34 pulls the lever to a position in which the roller 26 lies on the path of the rollers 22. The roller 26 is moved out of this trajectory by the operation of an electromagnet 33 controlled by the sensor.

For a better understanding of these operations reference should be made to FIGS. 3a to 3g. In FIGS. 3a to 3g, the sensor consists of two photoelectric cells I, II which are energised in synchronism with the suckers, and thus with the belt 2, by corresponding light sources Ia,IIa. The photoelectric cells (photoresistors) are spaced apart by a distance "a" which is smaller than the length "b" of an object. The time of energisation (time of reading) of the photoelectric cells is chosen such that during this time of reading, an object moves forward by a distance "c" which is less than the distance "a". P1 and P2 indicate an object at the beginning and at the end of the time of reading respectively, while P3 and P4 indicate the same object at the beginning and at the end of the next time of reading. It is apparent that the path "d" covered by an object between two times of reading represents the smallest distance apart which objects must have on the belt 1, because otherwise if this distance were less than "d", the photoelectric cells I, II could make two measurements on the same object during one working cycle of the apparatus. FIGS. 3a to 3g show various ways in which objects can arrive relative to the photoelectric cells. For example, in FIG. 3a, at the instant in which the photoelectric cells are energised (commencement of time of reading) the object P1 has still not reached the photoelectric cells, so that both photoelectric cells are illuminated (white circles) while at the instant in which the photoelectric cells become de-energised (end of time of reading) the photoelectric cell 1 is already obscured (crossed circles) as the object P2 has been moved between the photoelectric cell I and the light source Ia. It is possible to determine the position of each object on the belt 1, and thus relative to the sucker, from the condition of the photoelectric cells I, II at the beginning and end of time of reading, by means of suitable logic linkages using electronic circuits. For example, assuming that the condition is that shown in FIG. 3a in which the sucker leads the object, the electromagnet 33 becomes energised and displaces the rollers 26 downwards so that the object does not become gripped by the corresponding sucker, but by the subsequent one. The conditions shown in FIGS. 3b, c, d and e are suitable for action by the corresponding sucker, while the conditions shown in FIGS. 3f, 3g are such that the sucker lags the object and is no longer able to reach it. In this case the sucker is activated only by the roller 27.

It is apparent that the relative positions of the photoelectric cells I, II and the rollers 26, 27, and the delayed or anticipated activation of the suckers by the rollers 26, 27 depend on the speed of the belt 1 of the chain 26 and on the shape, and in particular the longitudinal dimensions, of the objects.

It is particularly advantageous if the suckers act rapidly both when the objects are taken up and deposited, so as to give increased productivity and precise operating times. Furthermore, because of their large soft contact surface, the suckers cause no damage to the objects.

We claim:

1. An apparatus for transferring at a predetermined spacing on to a reception conveyor objects fed at an irregular spacing from a delivery conveyor driven with continuous motion, consisting of a transfer conveyor which moves with continuous motion and at a speed different from that of the delivery conveyor from the delivery conveyor to the reception conveyor and comprises a first portion parallel to the delivery conveyor and a second portion parallel to the reception conveyor, object take-up suckers disposed at regular distances apart on the transfer conveyor for transferring the objects from the delivery conveyor and for depositing them at regular distances on the reception conveyor, and at least one sensor stationarily disposed in front of the first portion of the transfer conveyor and sensing the position of the objects on the delivery conveyor, characterized in that a valve is associated with each sucker and arranged to assume two stable positions relative thereto, namely a position of activation and a position of deactivation of the sucker, at least two control devices disposed in a fixed position along the first portion of the transfer conveyor and which by means of a selective control by the sensor assume a position of engagement with the sucker valves to move them into the activation position, and a further control device disposed in a fixed position on the second portion of the transfer conveyor such as to be able to engage with the sucker valves to move them into the deactivation position.

2. An apparatus as claimed in claim 1, wherein the sensor selectively controls the first control device in such a manner that the valve of each sucker assumes the activation position during its approach towards the centre of the respective object to be taken up.

3. An apparatus as claimed in claim 1, wherein each sucker consists of a body with a lower working face and a rear inclined face, in said body there being provided a duct connected to a suction pump and which has its outlet in the lower working face and is connected to an auxiliary duct which has its outlet in the inclined face, the sucker comprising a cover forming the valve and movable between a position in which the auxiliary duct is open and a position in which the auxiliary duct is closed, members being provided for retaining the cover in said positions.

4. An apparatus as claimed in claim 3, wherein the retention members consist of tension springs fitted between the sucker and cover, and which can retain the cover in two stable positions corresponding to the positions in which the auxiliary duct is open or closed.

5. An apparatus as claimed in claim 1, wherein the control devices disposed along the first portion of the transfer conveyor consist of a roller disposed in a fixed position at a certain distance from the sensor, and a roller disposed mobile in proximity to the sensor, the mobile roller being operated by an electromagnet controlled by the sensor in such a manner that the sucker is activated only when the sensor has detected that an object is in the correct position relative to said sucker.

6. An apparatus as claimed in claim 1, wherein the sensor consists of two photoelectric cells which are energised at each forward step of the reception conveyor for a predetermined time (time of reading), their condition at the beginning and at the end of this time of reading being processed by electronic circuits to determine the position of each object on the delivery conveyor relative to the suckers.

* * * * *